United States Patent
Ko

(10) Patent No.: US 9,656,630 B2
(45) Date of Patent: May 23, 2017

(54) CONTROL SYSTEM AND CONTROL METHOD FOR VEHICLE ANTI-THEFT

(71) Applicant: HON HAI PRECISION INDUSTRY CO., LTD., New Taipei (TW)

(72) Inventor: Hung-Chang Ko, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/819,925

(22) Filed: Aug. 6, 2015

(65) Prior Publication Data

US 2016/0297397 A1    Oct. 13, 2016

(30) Foreign Application Priority Data

Apr. 9, 2015  (TW) .............................. 104111503 A

(51) Int. Cl.
  *B60R 25/04*  (2013.01)
  *B60R 25/24*  (2013.01)
(52) U.S. Cl.
  CPC .............. *B60R 25/04* (2013.01); *B60R 25/24* (2013.01)
(58) Field of Classification Search
  CPC .................................. B60R 25/04; B60R 25/24
  See application file for complete search history.

(56) References Cited

U.S. PATENT DOCUMENTS

| 2011/0102164 A1* | 5/2011 | Ghabra ................... B60R 25/04 340/426.13 |
| 2011/0282520 A1 | 11/2011 | Nakashima et al. |
| 2016/0042579 A1* | 2/2016 | Austen ............... G07C 9/00309 340/5.61 |

FOREIGN PATENT DOCUMENTS

| DE | 102007041867 A1 | 3/2008 |
| DE | 102008007223 A1 | 8/2008 |
| EP | 2465737 A2 | 6/2012 |
| WO | WO2005109328 A1 | 11/2005 |

* cited by examiner

*Primary Examiner* — Leon Flores
(74) *Attorney, Agent, or Firm* — Steven Reiss

(57) ABSTRACT

A control method for vehicle anti-theft is provided. The control method includes as follows. Obtain a communication identification code of a smart key. Control a first wireless transmitting unit of the smart key to transmit a wireless signal containing the communication identification code. Obtain a predefined communication identification code; comparing the communication identification code with the predefined communication identification code. Obtain a control order randomly from the second storage unit when the communication identification code matches with the predefined communication identification code. Transmit a wireless signal containing the control order; setting communication parameters of the smart key according to the control order. Transmit a wireless signal containing the set communication parameters; determining whether the communication parameters match with the predefined communication parameters. Control the vehicle to start when the communication parameters match with the predefined communication parameters.

16 Claims, 4 Drawing Sheets

CONTROL SYSTEM AND CONTROL METHOD FOR VEHICLE ANTI-THEFT

FIELD

The subject matter herein generally relates to control systems and control methods for vehicle anti-theft, especially to a control system and a control method for vehicle anti-theft via changing communication parameters.

BACKGROUND

Passive Keyless Entry System (PKES) refers to a communication between a vehicle and a smart key via low-frequency signals and/or high-frequency signals, which can verify whether the smart key matches with the vehicle. However, PKES is easy to be relay attack.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
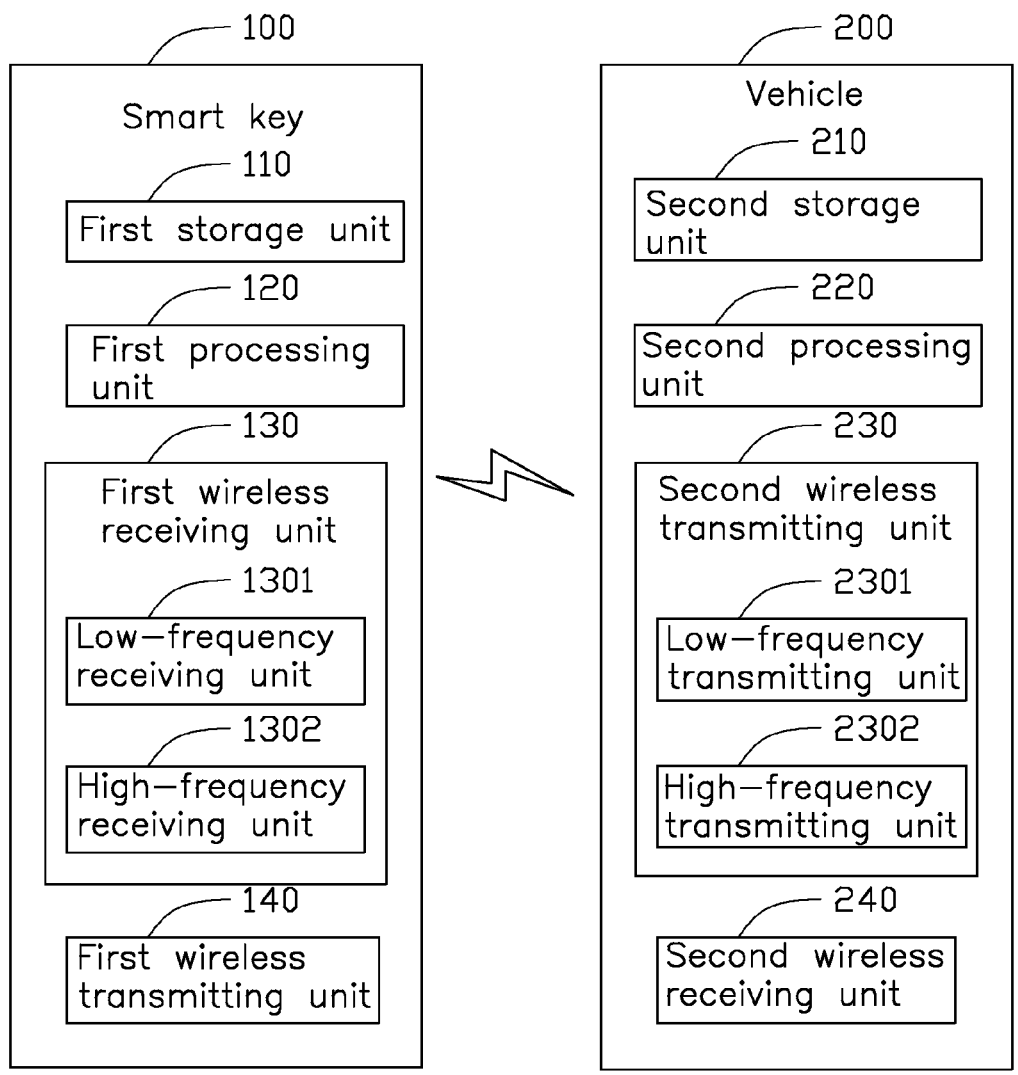
FIG. 1 is a block diagram of an embodiment of an operating environment of a control system for vehicle anti-theft.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure relates to a control system for vehicle anti-theft. The control system includes at least one processing unit and a non-transitory computer readable medium coupled to the at least one processing unit and configured to store instructions for execution by the at least one processing unit. The instructions cause the at least one processing unit to obtain a communication identification code of a smart key from a first storage unit of the smart key and control a first wireless transmitting unit of the smart key to transmit a wireless signal containing the communication identification code. The instructions cause the at least one processing unit to obtain the communication identification code from the wireless signal. The instructions cause the at least one processing unit to obtain a predefined communication identification code from a second storage unit of a vehicle. The instructions cause the at least one processing unit to compare the communication identification code with the predefined communication identification code. The instructions cause the at least one processing unit to obtain a control order randomly from the second storage unit when the communication identification code matches with the predefined communication identification code. The instructions cause the at least one processing unit to control a second wireless transmitting unit of the vehicle to transmit a wireless signal containing the control order. The instructions cause the at least one processing unit to set communication parameters of the smart key according to the control order. The instructions cause the at least one processing unit to control the first wireless transmitting unit to transmit a wireless signal containing the set communication parameters. The instructions cause the at least one processing unit to determine whether the set communication parameters matches with predefined communication parameters stored in the second storage unit of the vehicle. The instructions further cause the at least one processing unit to control the vehicle to start when the communication parameters match with the predefined communication parameters.

The present disclosure relates to a control method for vehicle anti-theft. The control method includes as follows. Obtaining a communication identification code of a smart key from a first storage unit of the smart key. Controlling a first wireless transmitting unit of the smart key to transmit a wireless signal containing the communication identification code. Obtaining the communication identification code from the wireless signal; obtaining a predefined communication identification code from a second storage unit of a vehicle. Comparing the communication identification code with the predefined communication identification code. Obtaining a control order randomly from the second storage unit when the communication identification code matches with the predefined communication identification code. Controlling a second wireless transmitting unit of the vehicle to transmit a wireless signal containing the control order. Setting communication parameters of the smart key according to the control order. Controlling the first wireless transmitting unit to transmit a wireless signal containing the set communication parameters. Determining whether the communication parameters matches with the predefined communication parameters. Controlling the vehicle to start when the communication parameters match with the predefined communication parameters.

The present disclosure relates to a non-transitory storage medium having stored thereon instructions that, when is executed by at least one processing unit of a vehicle, cause the least one processor to execute instructions of a control method for vehicle anti-theft. The control method includes as follows. Obtaining a communication identification code from a received wireless signal. Obtaining a predefined communication identification code from a storage unit of the vehicle. Comparing the communication identification code with the predefined communication identification code. Obtaining a control order randomly from the storage unit when the communication identification code matches with the predefined communication identification code. Controlling a wireless transmitting unit of the vehicle to transmit a wireless signal containing the control order. Receiving a wireless signal containing set communication parameters set according to the control order. Determining whether the communication parameters matches with predefined communication parameters. Controlling the vehicle to start when the communication parameters match with the predefined communication parameters.

Figure 2:
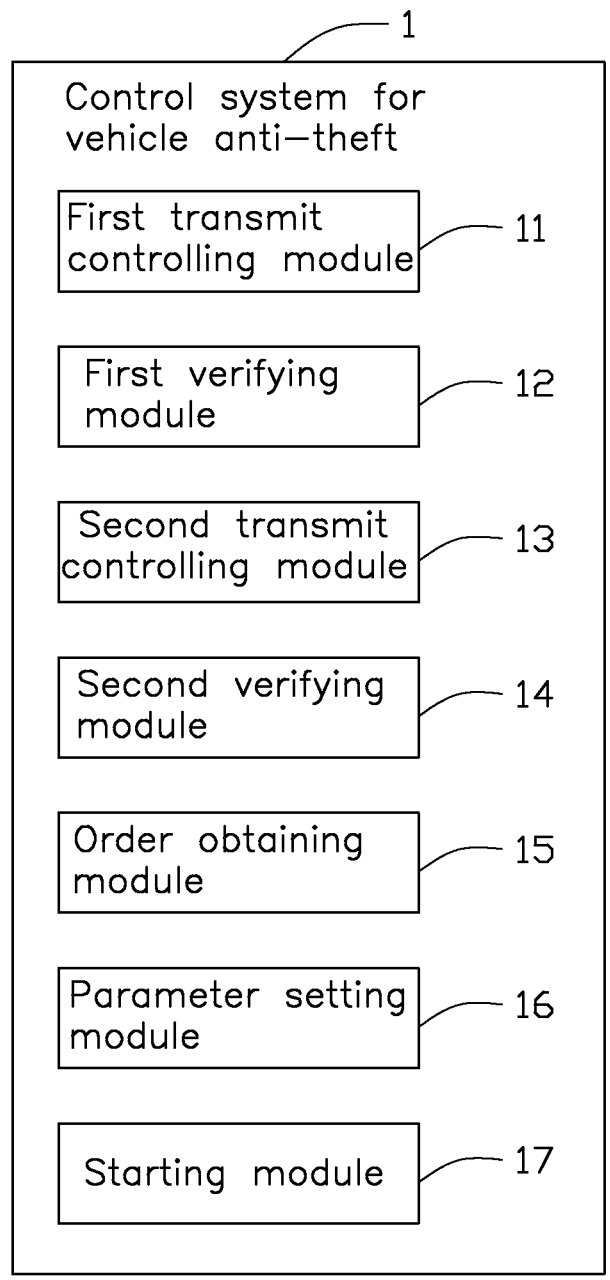
FIG. 2 is a block diagram of an embodiment of the control system for vehicle anti-theft as shown in FIG. 1.

FIG. 1 illustrates an operating environment of a control system for vehicle anti-theft as shown in FIG. 2. The operating environment can include but not limited to a smart key 100 and a vehicle 200.

The smart key 100 can include a first storage unit 110, a first processing unit 120, a first wireless receiving unit 130 and a first wireless transmitting unit 140.

The first storage unit 110 can store a predefined communication identification code of the vehicle 200 and a communication identification code of the smart key 100.

The first storage unit 110 can store a secret key for decoding a received low-frequency signal and/or a received high-frequency signal.

In this embodiment, the first wireless receiving unit 130 can include a low-frequency receiving unit 1301 and a high-frequency receiving unit 1302. The low-frequency receiving unit 1301 can be used to receive a low-frequency signal. The high-frequency receiving unit 1302 can be used to receive a high-frequency signal. The first wireless transmitting unit 140 can be a high-frequency transmitting unit. The high-frequency transmitting unit 140 can be used to transmit a high-frequency signal.

The vehicle 200 can include a second storage unit 210, a second processing unit 220, a second wireless transmitting unit 230 and a second wireless receiving unit 240.

In this embodiment, the second wireless transmitting unit 230 can include a low-frequency transmitting unit 2301 and a high-frequency transmitting unit 2302. The second wireless receiving unit 240 can be a high-frequency receiving unit.

The low-frequency transmitting unit 2301 can be attached to any locations of the vehicle 200, such as a front side of a driver's seat, a left side of the driver's seat, a right side of the driver's seat, a left side of a passenger's seat, a right side of the passenger's seat, a left side of a back seat, a right side of the back seat, or a back side of the back seat, or the like. The low-frequency transmitting unit 2301 can be used to transmit the low-frequency signal. A signal intensity of the low-frequency signal can be decreased rapidly with the distance increasing between the low-frequency signal and the low-frequency transmitting unit 2301. Furthermore, if the distance between the low-frequency signal and the low-frequency transmitting unit 2301 is greater than a predefined distance, the signal intensity of the low-frequency signal can be attenuated to zero.

The high-frequency transmitting unit 2302 can be attached to any locations of the vehicle 200, such as the front side of the driver's seat, the left side of the driver's seat, the right side of the driver's seat, the left side of the passenger's seat, the right side of the passenger's seat, the left side of the back seat, the right side of the back seat, or the back side of the back seat, or the like. The high-frequency transmitting unit 2302 can be used to transmit the high-frequency signal. The signal intensity of the high-frequency signal can be decreased rapidly with the distance increasing between the high-frequency signal and the high-frequency transmitting unit 2302. Furthermore, if the distance between the high-frequency signal and the high-frequency transmitting unit 2302 is greater than a predefined distance, the signal intensity of the high-frequency signal can be attenuated to zero.

The second wireless receiving unit 240 can be attached to any locations of the vehicle 200, such as the front side of the driver's seat, the left side of the driver's seat, the right side of the driver's seat, the left side of the passenger's seat, the right side of the passenger's seat, the left side of the back seat, the right side of the back seat, or the back side of the back seat, or the like. The second wireless receiving unit 240 can be used to receive the high-frequency signal transmitted by the smart key 100 via the high-frequency transmitting unit.

The second storage unit 210 can be used to store information including locations and unique identification codes of the low-frequency transmitting unit 2301, the second wireless receiving unit 240 and the high-frequency transmitting unit 2302.

The second storage unit 210 can be further used to store a communication identification code of the vehicle 200.

The second storage unit 210 can be further used to store all communication parameters of the smart key 100. The communication parameters can be but not limited to a predefined communication identification code, a signal energy, a signal intensity, a signal frequency, a modulation factor or the like.

The second storage unit 210 can be used to store a relationship recording a number of control orders and a number of predefined communication parameters. The control orders can be a changing order to modify the communication parameters of the smart key 100, for example, the control order can be calculating a new communication identification code according to the communication identification code, transmitting a high-frequency signal having a signal energy increased by a predefined value, transmitting a high-frequency signal having a signal intensity increased by a predefined value, transmitting a high-frequency signal having a signal frequency decreased by a predefined value, calculating a new modulation factor according to the modulation factor, or the like. The predefined communication parameters can be corresponding to the control orders. In at least one embodiment, the control orders can be a simple calculation for the communicating parameters of the smart key 100, or a complex calculation for the communicating parameters of the smart key 100.

In at least one embodiment, the first storage unit 110 and the second storage unit 210 can be an internal storage system, such as a flash memory, a random access memory (RAM) for temporary storage of information, and/or a read-memory (ROM) for permanent storage of information.

In at least one embodiment, the first storage unit 110 and the second storage unit 210 can also be a storage system, such as a hard disk, a storage card, or a data storage medium. The first storage unit 110 and the second storage unit 210 can include volatile and/or non-volatile storage devices.

In at least one embodiment, the first storage unit 110 and the second storage unit 210 can include two or more storage devices such that one storage device is a memory and the other storage device is a hard drive. Additionally, the first storage unit 110 and the second storage unit 210 can be respectively located either entirely or partially external relative to the smart key 100 and the vehicle 200.

In at least one embodiment, the first processing unit 120 and the second processing unit 220 can be a central processing unit, a digital signal processor, or a single chip, for example.

FIG. 2 illustrates the control system for vehicle anti-theft 1, the control system 1 can include a number of modules. The number of modules can include a first transmit controlling module 11, a first verifying module 12, a second transmit controlling module 13, a second verifying module 14, an order obtaining module 15, a parameter setting module 16 and a starting module 17. The number of modules can be stored in the first storage unit 110 and/or the second storage unit 210, and further applied on the first processing unit 120 and/or the second processing unit 220. In this embodiment, the first transmit controlling module 11, second verifying module 14 and the parameter setting module 16 can be stored in the first storage unit 110, and further applied on the first processing unit 120, and the first verifying module 12, the second transmit controlling module 13, the order obtaining module 15 and the starting module 17 can be stored in the second storage unit 210, and further applied on the second processing unit 220. The modules of the control system 1 can include separated functionalities represented by hardware or integrated circuits, or as software and hardware combinations, such as a special-purpose processor or a general-purpose processor with special-purpose firmware. The details are as follows.

The second transmit controlling module 13 can be used to obtain the communication identification code of the vehicle 200 and the unique identification code of the low-frequency transmitting unit 2301 from the second storage unit 210. The second transmit controlling module 13 can be used to control the low-frequency transmitting unit 2301 to transmit the low-frequency signal containing the communication identification code and the unique identification code.

The smart key 100 can receive the low-frequency signal via the low-frequency receiving unit 1301 when the smart key 100 is within a predefined distance of the vehicle 200.

The second verifying module 14 can be used to obtain the secret key from the first storage unit 110, and decode the low-frequency signal according to the secret key. The second verifying module 14 can be further used to obtain the communication identification code of the vehicle 200 and the unique identification code of the low-frequency transmitting unit 2301 from the low-frequency signal. The second verifying module 14 can be further used to obtain the predefined communication identification code from the first storage unit 110, and compare the predefined communication identification code with the communication identification code of the vehicle 200.

The first transmit controlling module 11 can be used to obtain the communication identification code of the smart key 100 from the first storage unit 110 when the predefined communication identification code matches with the communication identification code of the vehicle 200. The first transmit controlling module 11 can be further used to control the first wireless transmitting unit 140 to transmit the high-frequency signal having a predefined signal frequency and containing the communication identification code of the smart key 100.

The vehicle 200 can receive the high-frequency signal via the second wireless receiving unit 240 only when the vehicle 200 is within the predefined distance of the smart key 100 as the signal intensity of the high-frequency signal can be decreased, and the signal intensity of the received high-frequency signal is less than that of the transmitted high-frequency signal.

The first verifying module 12 can be used to obtain the communication identification code of the smart key 100 from the high-frequency signal, and obtain the predefined communication identification code of the smart key 100 from the second storage unit 210. The first verifying module 12 can be further used to compare the communication identification code with the predefined communication identification code, and determine whether the communication identification code matches with the predefined communication identification code.

The order obtaining module 15 can be used to obtain a control order randomly from the second storage unit 210 when the communication identification code matches with the predefined communication identification code. The order obtaining module 15 can be further used to control the high-frequency transmitting module 2302 to transmit a high-frequency signal having a predefined signal frequency and containing the control order.

The smart key 100 can receive the high-frequency signal via the high-frequency receiving unit 1302 when the smart key 100 is within the predefined distance of the vehicle 200.

The parameter setting module 16 can be used to obtain the secret key from the first storage unit 110, and decode the high-frequency signal according to the secret key to get the control order, and set the corresponding communication parameters of the smart key 100 according to the control order, and further control the first wireless transmitting unit 140 to transmit the high-frequency signal having a predefined signal frequency and containing the set communication parameters.

The vehicle 200 can receive the high-frequency signal via the high-frequency receiving unit 1302 when the vehicle 200 is within the predefined distance of the smart key 100.

The first verifying module 12 can be used to obtain the communication parameters from the high-frequency signal, obtain the predefined communication parameters corresponding to the control order from the second storage unit 210, determine whether the communication parameters matches with the predefined communication parameters. The first verifying module 12 can be used to generate a starting signal when the communication parameters matches with the predefined communication parameters. The first verifying module 12 can be used to not generate the starting signal when the communication parameters does not match with the predefined communication parameters.

The starting module 17 can be used to control the vehicle 200 to start in response of the starting signal. The starting module 17 cannot be used to control the vehicle 200 to start when not receiving the starting signal.

In at least one embodiment, the above control orders can be corresponding to one or more predefined communication parameters.

For example, the vehicle 200 can transmit a high-frequency signal containing a control order, the smart key 200 can receive the high-frequency signal to obtain the control order. If the control order is a control order transmitting a high-frequency signal having a signal frequency greater than a predefined value, the smart key 100 would transmit a high-frequency signal having a signal frequency greater than the predefined value according to the control order. The vehicle 200 can receive the high-frequency signal. The vehicle 200 can determine whether the signal frequency of the high-frequency signal is increased by the predefined value. If yes, it is determined that the smart key 100 is matched with the vehicle 200, and the vehicle 200 can be then started. Otherwise, it is determined that the smart key 100 is not matched with the vehicle 200, the vehicle 200 cannot be started.

For another example, the vehicle 200 can transmit a high-frequency signal containing a control order, the smart key 200 can receive the high-frequency signal to obtain the control order. If the control order can be a control order transmitting a high-frequency signal having a signal intensity greater than a predefined value, the smart key 100 would transmit a high-frequency signal having a signal intensity greater than the predefined value according to the control order. The vehicle 200 can receive the high-frequency signal. The vehicle 200 can determine whether the signal intensity of the high-frequency signal is increased by the predefined value. If yes, it is determined that the smart key 100 is matched with the vehicle 200, and the vehicle 200 can be then started. Otherwise, it is determined that the smart key 100 is not matched with the vehicle 200, the vehicle 200 cannot be started.

In at least one embodiment, the high-frequency receiving unit 1302 and the high-frequency transmitting unit 2302 can be omitted, the vehicle 200 can transmit a low-frequency signal via the low-frequency transmitting unit 2301 after receiving the high-frequency signal. The smart key 100 can receive the low-frequency signal via the low-frequency signal 1301. Such that, the verification between the smart key 100 and the vehicle 200 can be achieved.

In at least one embodiment, the low-frequency transmitting unit 2301 and the low-frequency receiving unit 1301 can be omitted. The vehicle 200 can transmit a high-frequency signal via the high-frequency transmitting unit 2302 after receiving a high-frequency signal. The smart key 100 can receive the high-frequency signal via the high-frequency signal 1302. Such that, the verification between the smart key 100 and the vehicle 200 can be achieved.

In at least one embodiment, in the above verification process, the vehicle 200 can transmit at least one control order to the smart key 100, the smart key 100 can reset the communication parameters according to the at least one control order, and further transmit the reset communication parameters to the vehicle 200. The vehicle 200 can verify the smart key 100 according to the reset communication parameters.

In at least one embodiment, the verification to the vehicle 200 can be omitted, that is, the second verifying module 14 can be omitted.

Figure 3:
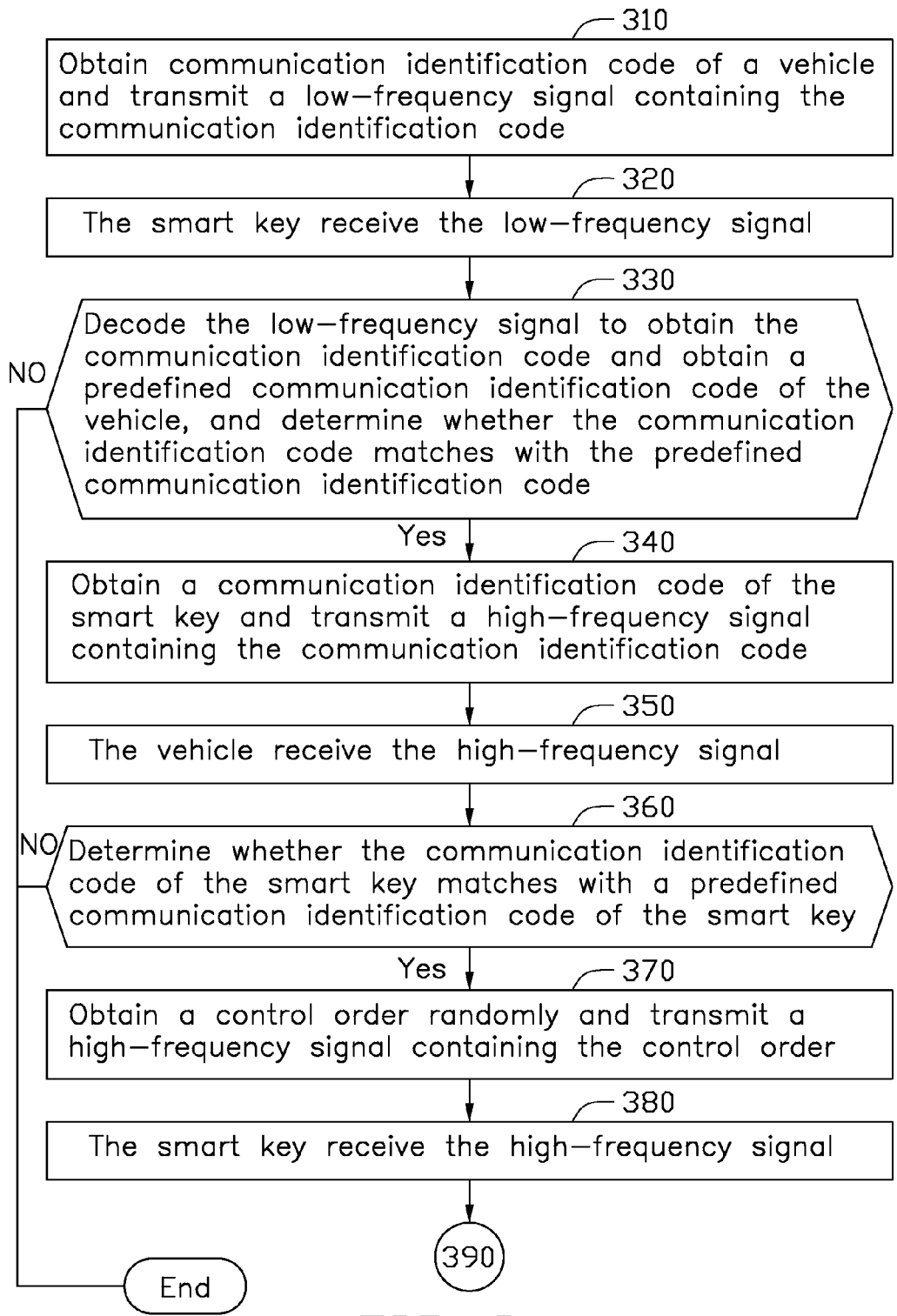
FIGS. 3 and 4 cooperatively constitute a signal flowchart of an embodiment of a control method for vehicle anti-theft.
Figure 4:
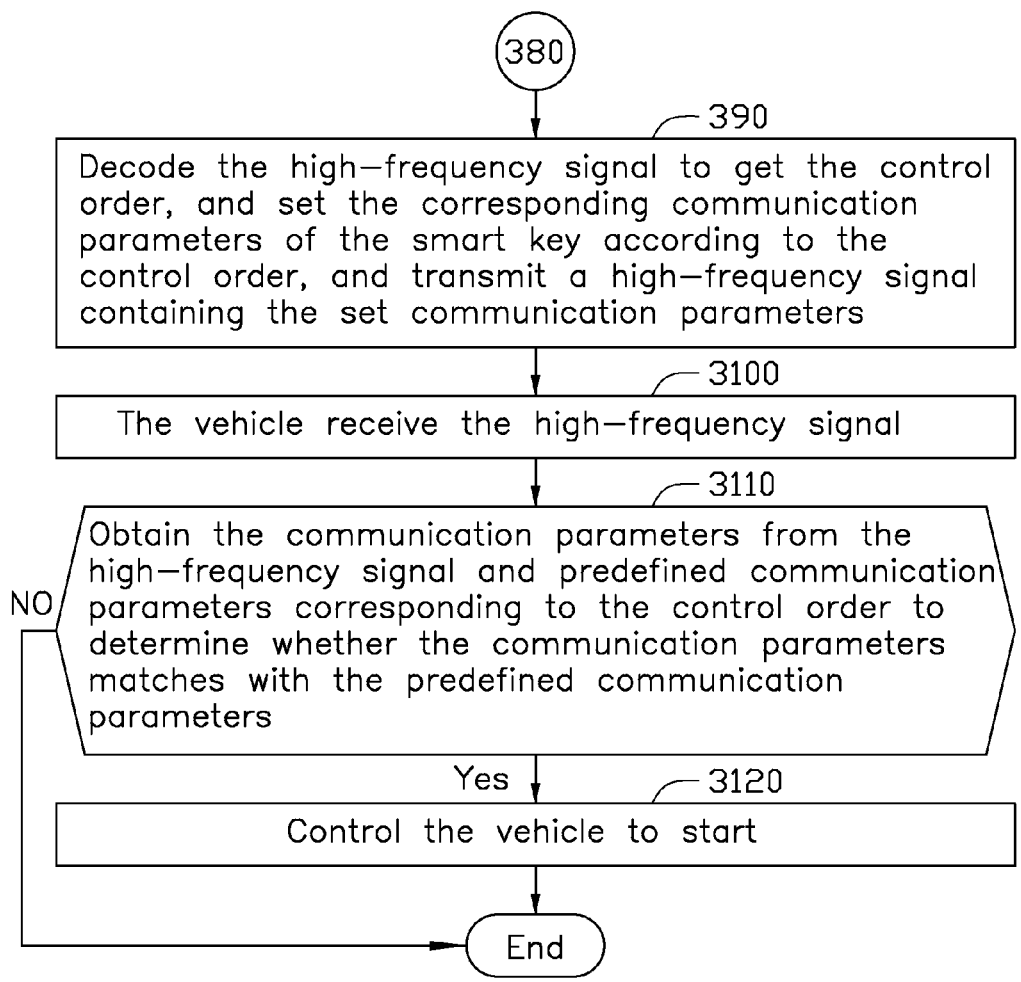

FIGS. 3 and 4 cooperatively illustrate a signal flowchart of a control method for vehicle anti-theft. The control method can be applied on a smart key and a vehicle. The smart key can include a first storage unit, a first processing unit, a first wireless receiving unit and a first wireless transmitting unit. The vehicle can include a second storage unit, a second processing unit, a second wireless transmitting unit and a second wireless receiving unit. The control method is provided by way of example, as there are a variety of ways to carry out the method. The control method described below can be carried out using the configurations illustrated in FIG. 2, for example, and various elements of these figures are referenced in explaining the example method. Each block shown in FIGS. 3 and 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 310.

At block 310, a second transmit controlling module obtains communication identification code of the vehicle from the second storage unit, and controls the second wireless transmitting unit to transmit a low-frequency signal containing the communication identification code.

At block 320, the smart key receives the low-frequency signal when the smart key is within a predefined distance of the vehicle.

At block 330, a second verifying module obtains a secret key from the first storage unit, and decode the low-frequency signal according to the secret key to obtain the communication identification code of the vehicle and the unique identification code of the low-frequency transmitting unit from the low-frequency signal, and obtains the predefined communication identification code of the vehicle from the first storage unit, and compares the predefined communication identification code with the communication identification code, and determines whether the communication identification code matches with the predefined communication identification code, if yes, the process goes to block 340, otherwise, the process goes to end.

At block 340, a first transmit controlling module obtains the communication identification code of the smart key from the first storage unit and controls the first wireless transmitting unit to transmit a high-frequency signal containing the communication identification code of the smart key.

At block 350, the vehicle receives the high-frequency signal when the vehicle is within the predefined distance of the smart key.

At block 360, a first verifying module obtains the communication identification code from the high-frequency signal, and obtains a predefined communication identification code of the smart key from the second storage unit, and compares the communication identification code with the predefined communication identification code, and determines whether the communication identification code matches with the predefined communication identification code, if yes, the process goes to block 370, otherwise, the process goes to end.

At block 370, an order obtaining module obtains a control order randomly from the second storage unit, and controls the high-frequency transmitting module to transmit a high-frequency signal containing the control order.

At block 380, the smart key receives the high-frequency signal via the high-frequency receiving unit when the smart key is within the predefined distance of the vehicle.

At block 390, a parameter setting module obtains the secret key from the first storage unit, and decodes the high-frequency signal according to the secret key to get the control order, and sets the corresponding communication parameters of the smart key according to the control order, and further controls the first wireless transmitting unit to transmit a high-frequency signal containing the set communication parameters.

At block 3100, the vehicle receives the high-frequency signal via the high-frequency receiving unit when the vehicle is within the predefined distance of the smart key.

At block 3110, a first verifying module obtains the communication parameters from the high-frequency signal, obtains the predefined communication parameters corresponding to the control order from the second storage unit, determines whether the communication parameters matches with the predefined communication parameters, if yes, the process goes to block 3120, otherwise, the process goes to end.

At block 3120, a starting module controls the vehicle to start.

The embodiments shown and described above are only examples. Many details are often found in the art such as the other features of control system and control method for vehicle anti-theft. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A control system for vehicle anti-theft comprising:
at least one processing unit; and
a non-transitory computer readable medium coupled to the at least one processing unit and having instructions stored thereon for execution by the at least one processing unit, the instructions causing the at least one processing unit to:
obtain a communication identification code from a set of stored communication parameters stored in a first storage unit of a smart key and control a first wireless transmitting unit of the smart key to transmit a wireless signal containing the communication identification code of the smart key to a vehicle, wherein the first storage unit stores communication parameters of the smart key;
obtain the communication identification code from the wireless signal;
obtain a predefined communication identification code from a second storage unit of the vehicle, wherein the second storage unit stores the communication parameters of the smart key, a plurality of unique control orders, and a plurality of predefined communication parameters, the plurality of predefined communication parameters each corresponding to one of the plurality of control orders and each calculated according to one of the communication parameters;
compare the communication identification code of the smart key with the predefined communication identification code stored in the second storage unit;
obtain one of the plurality of control orders randomly from the second storage unit when the communication identification code matches with the predefined communication identification code, and control a second wireless transmitting unit of the vehicle to transmit a wireless signal containing the control order to the smart key;
set communication parameters of the smart key according to the one of the plurality of control orders contained in the wireless signal transmitted from the vehicle;
control the first wireless transmitting unit of the smart key to transmit a wireless signal containing the set communication parameters to the vehicle;
determine whether the set communication parameters match with the predefined communication parameters stored in the second storage unit of the vehicle, the predefined communication parameters matching with the one of the plurality of control orders; and
control the vehicle to start when the set communication parameters match with the predefined communication parameters, the predefined communication parameters matching with the one of the plurality of control orders.

2. The control system of claim 1, wherein the instructions causes the at least one processing unit to prevent the vehicle from starting when the communication parameters do not match with the predefined communication parameters, the predefined communication parameters matching with the one of the plurality of control orders.

3. The control system of claim 1, wherein the instructions causes the at least one processing unit to
obtain a communication identification code of the vehicle from the second storage unit and control the second wireless transmitting unit of the vehicle to transmit a wireless signal containing the communication identification code; and
obtain the communication identification code of the vehicle from the wireless signal and obtain a predefined communication identification code from the first storage unit, and compare the predefined communication identification code with the communication identification code of the vehicle; and
obtain the communication identification code of the smart key from the first storage unit of the smart key when the predefined communication identification code matches with the communication identification code of the vehicle.

4. The control system of claim 3, wherein the instructions causes the at least one processing unit to obtain a secret key from the first storage unit, and decode the received wireless signal according to the secret key each time the smart key receives the wireless signal transmitted from the vehicle.

5. The control system of claim 1, wherein the instructions causes the at least one processing unit to randomly obtain another control order from the second storage unit to verify the smart key again when the communication identification code matches with the predefined communication identification code.

6. The control system of claim 1, wherein the communication parameter is selected from a group consisting of: signal frequency, signal energy, signal intensity, communication identification code and modification factor.

7. The control system of claim 1, wherein the instructions causes the at least one processing unit to obtain a secret key from the first storage unit, and decode the received wireless signal according to the secret key to get the control order.

8. A control method for vehicle anti-theft comprising:
obtaining a communication identification code from a set of stored communication parameters stored in a first storage unit of a smart key, wherein the first storage unit stores communication parameters of the smart key;
controlling a first wireless transmitting unit of the smart key to transmit a wireless signal containing the communication identification code of the smart key to a vehicle;
obtaining the communication identification code from the wireless signal;
obtaining a predefined communication identification code from a second storage unit of the vehicle, wherein the second storage unit stores the communication parameters of the smart key, a plurality of unique control orders, and a plurality of predefined communication parameters, the plurality of predefined communication parameters each corresponding to one of the plurality of control orders and each calculated according to one of the communication parameters;
comparing the communication identification code of the smart key with the predefined communication identification code stored in the second storage unit;
obtaining one of the plurality of control orders randomly from the second storage unit when the communication identification code matches with the predefined communication identification code to the smart key;
controlling a second wireless transmitting unit of the vehicle to transmit a wireless signal containing the control order;
setting communication parameters of the smart key according to the one of the plurality of control orders contained in the received wireless signal transmitted from the vehicle;

controlling the first wireless transmitting unit of the smart key to transmit a wireless signal containing the set communication parameters to the vehicle;

determining whether the set communication parameters match with the predefined communication parameters stored in the second storage unit of the vehicle, the redefined communication parameters matching with the one of the plurality of control orders; and controlling the vehicle to start when the set communication parameters match with the predefined communication parameters, the predefined communication parameters matching with the one of the plurality of control orders.

9. The control method of claim 8, the control method further comprising:

preventing the vehicle from starting when the communication parameters do not match with the predefined communication parameters which are matched with the one of the plurality of control orders.

10. The control method of claim 8, wherein prior to obtaining a communication identification code from a set of stored communication parameters stored in a first storage unit of a smart and controlling a first wireless transmitting unit of the smart key to transmit a wireless signal containing the communication identification code of the smart key to a vehicle, the control method comprises:

obtaining a communication identification code of the vehicle from the second storage unit and controlling the second wireless transmitting unit of the vehicle to transmit a wireless signal containing the communication identification code;

obtaining the communication identification code of the vehicle from the wireless signal and obtain a predefined communication identification code from the first storage unit; and comparing the predefined communication identification code with the communication identification code of the vehicle.

11. The control method of claim 10, wherein prior to obtaining the communication identification code of the vehicle from the wireless signal and obtain the predefined communication identification code from the first storage unit, the control method further comprising:

obtaining a secret key from the first storage unit, and decoding the received wireless signal according to the secret key.

12. The control method of claim 8, wherein before obtaining the communication identification code from the wireless signal, the control method further comprises:

obtaining a secret key from the first storage unit, and decoding the received wireless signal according to the secret key to get the control order.

13. The control method of claim 8, wherein the communication parameter is selected from a group consisting of: signal frequency, signal energy, signal intensity, communication identification code and modification factor.

14. A non-transitory storage medium having stored thereon instructions that, when executed by at least one processing unit of a vehicle, causes the least one processor to execute instructions of a control method for vehicle anti-theft, the control method comprising:

obtaining a communication identification code of a smart key from a received wireless signal transmitted from the smart key;

obtaining a predefined communication identification code from a storage unit of the vehicle, wherein the storage unit stores the communication parameters of the smart key, a plurality of control orders different from each other, and a plurality of predefined communication parameters, the plurality of predefined communication parameters each corresponding to one of the plurality of control orders and each calculated according to one of the communication parameters;

comparing the communication identification code of the smart key with the predefined communication identification code stored in the storage unit;

obtaining one of the plurality of control orders randomly from the storage unit when the communication identification code matches with the predefined communication identification code;

controlling a wireless transmitting unit of the vehicle to transmit a wireless signal containing the control order to the smart key;

receiving a wireless signal containing set communication parameters set according to the control order contained in the received wireless signal transmitted from the vehicle;

determining whether the set communication parameters match with predefined communication parameters; and controlling the vehicle to start when the set communication parameters match with the predefined communication parameters, the predefined communication parameters matching with the one of the plurality of control orders.

15. The non-transitory storage medium of claim 14, the control method further comprising:

preventing the vehicle from starting when the communication parameters do not match with the predefined communication parameters.

16. The non-transitory storage medium of claim 14, wherein the communication parameter is selected from a group consisting of: signal frequency, signal energy, signal intensity, communication identification code and modification factor.

* * * * *